VARIABLE CAPACITANCE MODULATION CIRCUIT

Filed Oct. 16, 1963 3 Sheets-Sheet 1

INVENTORS
Zenmon Abe
Nobuhiko Aoki
BY
Moslem and Moslem

INVENTOR.
Zenmon Abe
Nobuhiko Aoki
BY
Wenderoth and Wenderoth

INVENTOR.
Zenmon Abe
Nobuhiko Aoki
BY
Meston and Meston

United States Patent Office 3,270,297

Patented August 30, 1966

3,270,297

VARIABLE CAPACITANCE MODULATION CIRCUIT

Zenmon Abe, Kokubunji-machi, Kitatama-gun, Tokyo-to, and Nobuhiko Aoki, Hachioji-shi, Japan, assignors to Kabushiki Kaisha Hitachi Seisakusho, Tokyo-to, Japan, a joint-stock company of Japan Filed Oct. 16, 1963, Ser. No. 316,704
Claims priority, application Japan, Oct. 18, 1962, 37/45,218
2 Claims. (Cl. 332—47)

Figure 1:
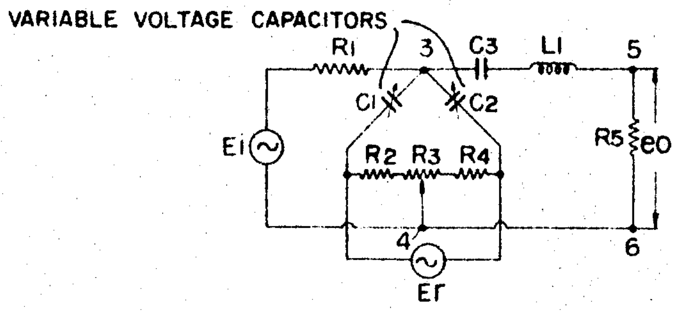

The present invention relates to modulation circuits, and more particularly it relates to a new modulation circuit in which a variable capacitance modulator is used.

It is an object of the invention, in its broader aspects, to overcome certain difficulties in conventional modulation circuits of similar type, as will be described in detail hereinafter, and to provide a new variable capacitance modulation circuit capable of supplying modulated power at a higher efficiency than conventional circuits of similar type.

Figure 2:
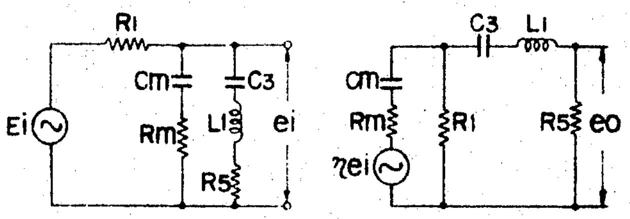
Figure 3:
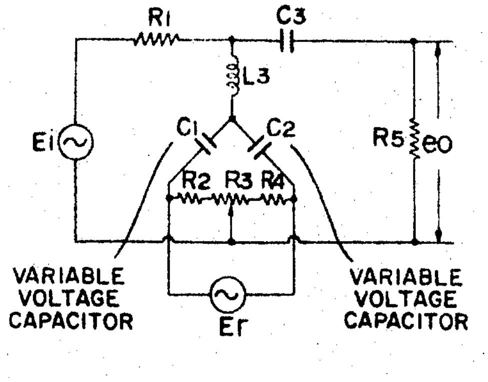
Figure 4A:
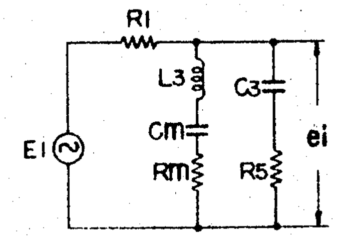
Figure 4B:
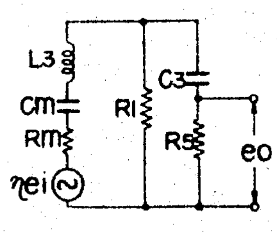
Figures 7, 8, 9, 10:
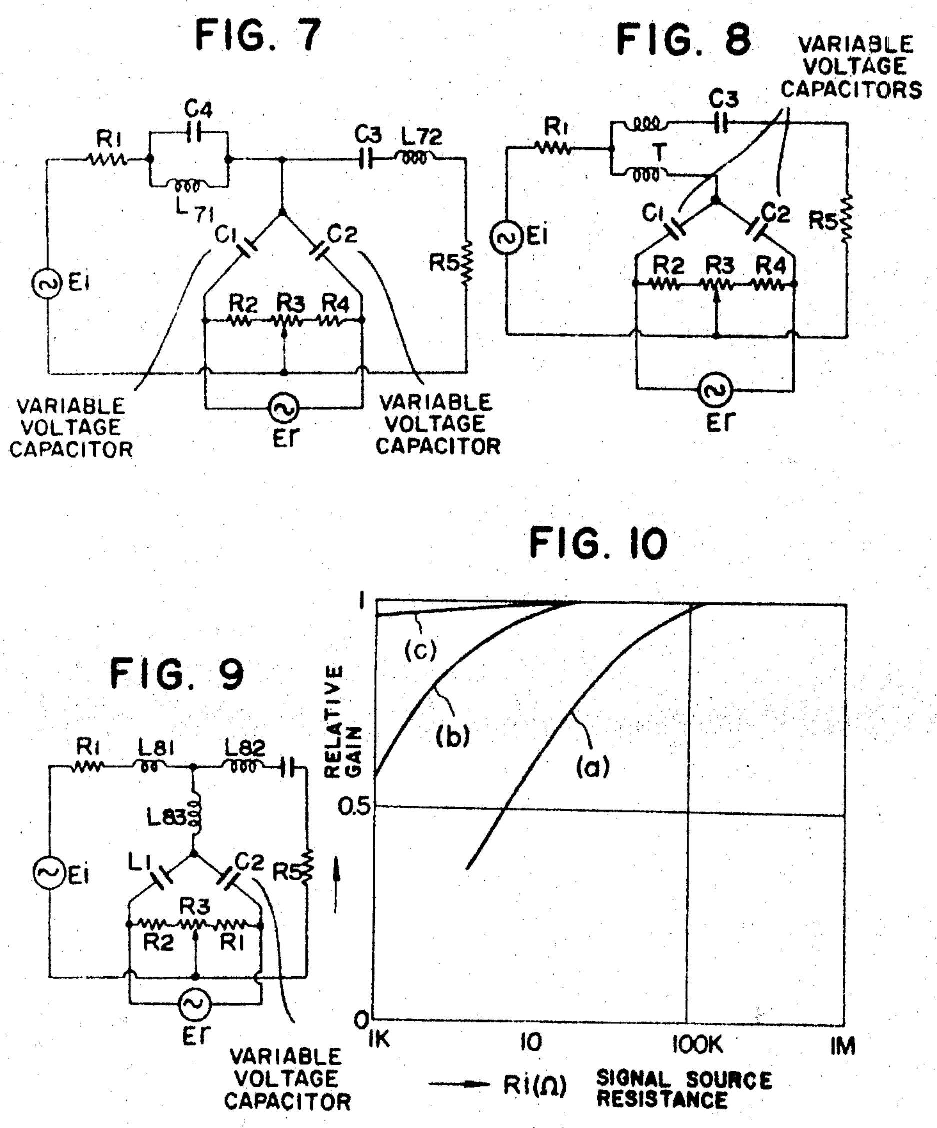

The nature, principle, and details of the invention, as well as the manner in which the foregoing object, other objects, and advantages of the invention may best be achieved, will be most clearly understood by reference to the following description, when taken in conjunction with the accompanying drawings in which like parts are designated by like reference characters and capacitance value and resistance value are designated by the same reference characters representing the capacitor and resistor, and in which:

FIG. 1 is an electrical circuit diagram indicating a variable capacitance modulation circuit of known bridge type;

FIGS. 2(*a*) and 2(*b*) are diagrams of equivalent circuits of the circuit shown in FIG. 1, FIG. 2(*a*) showing an equivalent circuit with respect to modulating frequency, and FIG. 2(*b*) showing an equivalent circuit with respect to modulated frequency;

FIG. 3 is a circuit diagram indicating a preferred embodiment of the variable capacitance modulator according to the invention;

FIGS. 4(*a*) and 4(*b*) are diagrams of equivalent circuits of the circuit shown in FIG. 3, FIG. 4(*a*) showing an equivalent circuit with respect to modulating frequency, and FIG. 4(*b*) showing an equivalent circuit with respect to modulated frequency;

FIGS. 5, 6, 7, 8, and 9, inclusive, are circuit diagrams indicating other preferred embodiments of the invention; and FIG. 10 is a graphical representation indicating a comparison of the characteristics of a conventional variable capacitance modulator and of the variable capacitance modulator of this invention.

It is believed that, for a full understanding and appreciation of the nature and effectiveness of the present invention, the following consideration of a few aspects of prior modulators of the instant type is desirable, principally for the purposes of comparison and of clarification of the aforementioned difficulties associated with conventional modulators of the instant type.

Referring to FIG. 1, which shows a known modulating circuit, two sources $E_1$ and $E_r$ respectively a modulating signal voltage $E_1$ and a carrier voltage $E_r$ of the modulator, impressing these voltages across the terminals of variable capacitors $C_1$ and $C_2$ to cause their capacitances to vary. The modulating signal source impedance is designated herein by a reference character $R_1$.

Ordinarily, the frequency of the voltage $E_r$ is selected to be amply higher than the frequency of the voltage $E_1$. The capacitors $C_1$ and $C_2$ consist of voltage variable capacitors and are ordinarily in the form of pn junctions of silicon or germanium on which zero bias voltage is applied or a reverse bias voltage is suitably applied. The capacitors $C_1$ and $C_2$, together with resistors $R_2$, $R_3$, and $R_4$, form a modulator bridge, the resistor $R_3$ being a variable resistor for balancing the bridge at the time of no input. A coupling capacitor $C_3$ is provided as shown for the purpose of suppressing the modulating signal and passing the carrier signal. The circuit is further provided with an inductance $L_1$ and a load resistor $R_5$, both connected in series with coupling capacitor $C_3$. The inductance $L_1$ is inserted for the purpose of causing the series circuit consisting of the bridge circuit and the load resistor $R_5$ to resonate with respect to the modulated frequency, lowering the output impedance of the modulator as viewed from the load resistor $R_5$, and increasing the transfer efficiency of the modulated signal power.

The modulator of the above-described arrangement has the following operation. When the carrier voltage $E_r$ is applied on the voltage variable capacitors $C_1$ and $C_2$ the capacitive impedance of the modulator bridge circuit, as viewed from the terminals designated by reference numerals 3 and 4, varies, whereby the carrier signal is amplitude modulated. At the same time, the circuit is resonating with respect to this modulated signal because of the functioning of the inductance $L_1$. Therefore, if the load resistor $R_5$ is placed in a state of impedance being matched with respect to the resistance component of the impedance of the modulator as viewed from the terminals designated by reference numerals 5 and 6, the modulated signal power will be effectively transferred to the load, without being suppressed by the capacitive impedance of the modulator bridge circuit, within the range of operation wherein the modulating signal source impedance $R_1$ is amply higher than the impedance of the modulator bridge. This circuit, however, has the disadvantage of a great reduction in power gain when the modulating signal source impedance $R_1$ can no longer be considered to be amply high. This aspect of this circuit will now be considered below in connection with the equivalent circuits shown in FIG. 2.

The modulation circuit shown in FIG. 1 can be represented equivalently as indicated in FIG. 2, wherein FIG. 2(*a*) indicates the equivalent representation with respect to the modulating frequency, and FIG. 2(*b*) indicates that with respect to modulated frequency. In these circuits, the reference character $C_m$ designates a virtual capacitance value which is approximately determined by the variable capacitors $C_1$ and $C_2$. The reference character $R_m$ designates the real component of the impedance of the modulator bridge circuit at the modulated frequency determined by the impedances of the arm resistors $R_2$, $R_3$, and $R_4$ of the bridge. The reference character $\eta E_1$ designates a power source representing the modulated signal voltage, in which $\eta$ is the voltage conversion efficiency in the case when it is assumed that the impedance $R_1$ and resistance of the resistor $R_5$ are sufficiently higher than the modulator bridge impedance $$Z_m = R_m + \frac{1}{j\omega_r C_m}$$

and when it is assumed that, with respect to the modulating signal frequency, the impedance, when the modulator side is viewed from the aforementioned terminals 3 and 4, is sufficiently higher than the impedance $R_1$.

Determination of the relationship between the voltage $e_1$ and $e_0$ from these equivalent circuits results in the following equation.

$$e_o=\frac{\eta E_i}{1+\frac{R_m}{R_1}+\frac{|Z_{mo}|^2}{R_1(R_1+R_m)}}\times\frac{R_5}{R_5+\frac{R_m+\frac{|Z_{mo}|^2}{R_1+R_m}}{1+\frac{R_m}{R_1}+\frac{|Z_{mo}|^2}{R_1(R_1+R_m)}}} \quad (1)$$

where:

$$|Z_{mo}|=\frac{1}{\omega_r C_m}$$

and $\omega_r$ is the angular velocity of the frequency of the carrier source. The circuit will be considered to be in complete resonance.

Accordingly, the maximum power can be obtained from the modulator when the following equation is satisfied.

$$R_5=\frac{R_m+\frac{|Z_{mo}|^2}{R_1+R_m}}{1+\frac{R_m}{R_1}+\frac{|Z_{mo}|^2}{R_1(R_1+R_m)}} \quad (2)$$

and the output power at this time becomes that expressed by the following equation.

$$P_{max}=\frac{\eta^2 E_i^2}{4\left\{1+\frac{R_m}{R_1}+\frac{|Z_{mo}|^2}{R_1(R_1+R_m)}\right\}\left\{R_m+\frac{|Z_{mo}|^2}{R_1+R_m}\right\}} \quad (3)$$

Therefore, in the operational range wherein the impedance $R_1$ is amply large, and the conditions expressed by $$R_m\gg\frac{|Z_{mo}|^2}{R_1+R_m} \quad (4)$$

and $$1\gg\frac{R_m}{R_1}+\frac{|Z_{mo}|^2}{R_1(R_1+R_m)} \quad (5)$$

are satisfied, the maximum output power becomes $$P_{max}=\frac{\eta^2 E_i^2}{4R_m} \quad (6)$$

In the case, the lower the value of $R_m$ is made, the higher the power amplification will become. In actual practice, however, there are limiting factors such as a limit to the value at which the angular frequency $r$ can be taken, a restriction due to the available component for the capacitance $C_m$, and a limitation imposed by the requirement for the response of the input circuit. Consequently, it is difficult to decrease the value of $|Z_{mo}|$ beyond a certain value in order to satisfy the conditions of Equations 4 and 5. Therefore, even if the value of $R_m$ is made low, if the value of $R_1$ becomes low, it becomes difficult to satisfy the conditions of Equations 4 and 5; and, because of the influence represented by the second terms and thereafter within the brackets in the denominator on the righthand side of Equation 3, the power amplification is greatly reduced.

For example, in the case when $R_m=1$ kilo-ohm, $Z_{mo}=10$ kilo-ohms, and $R_1=10$ kilo-ohms, the output power is reduced to approximately $\frac{1}{20}$ of that in the case when the impedance $R_1$ is amply high, and the Equations 4 and 5 are satisfied.

It is a specific object of the present invention to overcome the above-described difficulty experienced in the prior art and to provide a new variable capacitance modulation circuit whereby amply high power amplification can be obtained even in the case when the modulating signal source impedance is low.

In a conventional circuit of this type, the inductance $L_1$ for resonance is inserted in the coupling circuit between the modulator bridge and the load resistor $R_5$. Accordingly, in this case, when the modulator is viewed from the load side, resonance is evident with respect to the modulated frequency, but when the modulator is viewed from the input side, there is no resonance. For this reason, the difficulty as described above exists.

In an embodiment of the present invention as shown in FIG. 3, a resonating inductance $L_3$ is inserted between the output end of the bridge circuit and the branching point of the input circuit of the modulating signal and load circuit. Therefore, if the capacitance of the capacitor $C_3$ is selected to be amply higher than the resultant capacitance of the capacitors $C_1$ and $C_2$, the modulator will be resonating when viewed from either the modulating input or the modulated output side.

The relationship between the input and output voltage at the time of resonance may be determined in the following manner through the use of the equivalent circuits shown in FIG. 4.

With the assumption that $$\frac{1}{\omega_r C_3}\ll R_5$$

the following equation is obtained.

$$e_o=\frac{\eta E_i}{1+\frac{R_m}{R_1}}\cdot\frac{R_5}{R_5+\frac{R_m}{1+\frac{R_m}{R_1}}} \quad (7)$$

Therefore, the maximum power is obtained under the condition represented by the following equation.

$$R_5=\frac{R_m}{1+\frac{R_m}{R_1}} \quad (8)$$

The maximum modulated output power under this condition is as follows:

$$P_{max}=\frac{\eta^2 Ei^2}{4\left(1+\frac{R_m}{R_1}\right)R_m} \quad (9)$$

When, similarly as in the example described hereinbefore, the values of $R_1$ and $R_m$ are selected to be 10 kilo-ohms and 1 kilo-ohm, respectively, the modulated output power loss is a mere 10 percent of that in the ideal case when $R_1$ is amply high.

Thus, it is to be observed that by the practice of the present invention, a pronounced improvement is obtained in power gain relative to that afforded by conventional circuits.

Furthermore, the resonance of the modulator, with respect to the modulated frequency, as viewed from the modulating input side and the lowered state of the impedance at this time have the effect of damping noise in the vicinity of the frequency of the carrier signal source. Therefore, the modulation circuit according to this invention is superior to conventional circuits also on the point of noise.

On one hand, in the case of the circuit shown in FIG. 3, the value of the capacitance of the coupling capacitor $C_3$, which couples the load resistor $R_5$ and the modulator bridge, must be made substantially high in order to reduce the modulated signal transfer loss. In the case when a transistor amplifier is connected for this purpose to the modulator modulated output end, low-frequency transistor noise (ordinarily $l/f$ noise which is extremely high compared with high-frequency noise) passes through the capacitor $C_3$ and enters the modulator bridge, where it is further modulated to a high frequency and added to the output. As a result in some cases, the total noise is greatly increased. This tendency is pronounced particularly in the case wherein the input signal source impedance $R_1$ is high. Furthermore, a high capacitance value of the capacitor $C_3$ is disadvantageous in that the response is lowered when the modulating signal source impedance $R_1$ is relatively high.

Figures 5, 6:
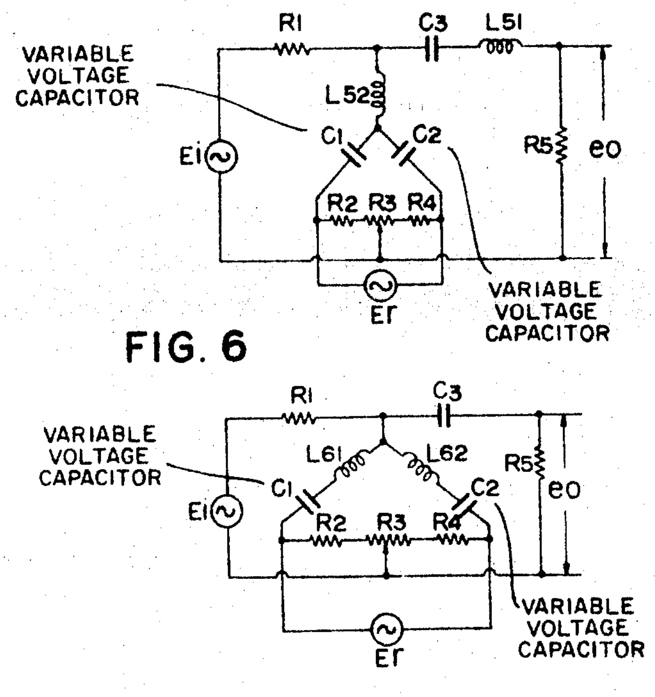

Accordingly, in order to overcome such difficulties, the present invention, in one embodiment thereof as shown in FIG. 5, provides a circuit wherein resonance with respect to the capacitive component of the modulator bridge is caused by an inductance $L_{52}$, and then coupling to the output is accomplished by a resonance circuit formed by an inductance $L_{51}$ and a capacitor $C_3$ connected as shown, a low capacitance value of the capacitor $C_3$ being selected, and the impedance at low frequency being caused to be high, so as to cause resonance at only the carrier frequency and to lower the impedance. Another effective arrangement for attaining the same results is the embodiment of the invention shown in FIG. 6, wherein inductances $L_{61}$ and $L_{62}$ are inserted in series connection respectively with the variable capacitors $C_1$ and $C_2$ which form the bridge, and series resonance is caused with respect to the modulated frequency.

Even in the circuits shown in FIGS. 3 and 5, when the value of the modulating signal source impedance $R_1$ is very low and becomes equal to or less than the resistance component $R_m$ of the modulator bridge impedance, the conversion efficiency drops abruptly. As one method of preventing this undesirable phenomenon, there is the expedient of inserting in series with the modulating signal source impedance a resistance of a value which will not lower the conversion efficiency. This method, however, has the disadvantage of increase in the thermal noise of the resistor.

One circuit embodying the present invention in which the above-described disadvantage is eliminated is shown in FIG. 7. In this circuit, a parallel resonance circuit composed of an inductance $L_{71}$ and a capacitor $C_4$ and resonating at the modulated frequency is inserted in series connection with the modulating signal source impedance $R_1$, and a capacitor 3 and an inductance $L_{72}$ are connected in series to the said resonance circuit. By making the resonance impedance of this resonance circuit amply higher than the impedance of the modulator bridge, it is possible to increase only the modulation efficiency without causing an increase in the noise. As long as the impedance with respect to the exciting frequency of the inductance $L_{71}$ is sufficiently high, it is not always necessary to cause parallel resonance through the use of the capacitance $C_4$. Effective results can be obtained, of course, also by combining the arrangement described above with the circuit shown in FIG. 3 or that shown in FIG. 5.

It is also possible to use the leakage inductance and exciting inductance possessed by a transformer for the inductance used in any of the above-described circuits. For example, by a circuit arrangement as shown in FIG. 8, the equivalent circuit shown in FIG. 9 is obtained, as is known, from the equivalent circuit of a transformer. In this case, the reference character T in FIG. 8 designates a transformer inserted for the above-stated purpose, while the inductance designated by reference character $L_{81}$ in the FIG. 9 is equivalent to the exciting inductance of the transformer T, and the inductances designated by reference characters $L_{82}$ and $L_{83}$ are equivalent to the leakage inductance of the same transformer T. This has the same effect as connecting inductances additionally in series connection to the modulating signal source resistor in the circuit shown in FIG. 5, and this modification has substantially the same effectiveness as a combination of the circuits shown in FIGS. 5 and 7. At the same time, since in the circuit shown in FIG. 8 a single transformer is used in place of two or three inductances, this circuit has the advantageous feature of simple construction.

As will be apparent from the foregoing detailed disclosure, by inserting at least one inductance in a variable capacitance modulator so as to cause resonance with respect to the modulated frequency, as viewed from both the modulating input and modulated output sides of the modulator, it is possible to increase the modulation efficiency and power gain of the modulator, as is indicated in FIG. 10. In FIG. 10, the curves indicate relationships between relative value of gain and signal source resistance value, the curve *a* indicating the relationship for the case of the known circuit shown in FIG. 1, the curve *b* indicating that for the case of the embodiment circuit shown in FIG. 3, and the curve *c* indicating that for the case of the embodiment circuit shown in FIG. 7.

Although the foregoing disclosure has described specific embodiments of the invention wherein variable capacitance diodes having capacitance values which vary in accordance with the magnitude of the impressed voltage are used for the variable capacitors, other types of variable capacitors which are driven by a mechanical energy source or some other kind of energy source may be used for these variable capacitors. Furthermore, while the case of a modulator made up of a bridge circuit has been described, it is also possible to form the modulator from a single variable capacitor as indicated in the equivalent circuits shown in FIGS. 2 and 4. The application of the present invention to any of these cases is effective.

Thus, it is to be understood, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A variable capacitance diode modulator comprising, in combination, first and second interconnected resonating inductance elements; a four-arm bridge circuit having a variable capacitance diode in at least one arm; an input resistor connected to said second resonating inductance element and to one junction of said bridge circuit; a first pair of opposed junctions including said one junction of said bridge circuit being connected to a modulating signal source; a second pair of opposed junctions being connected to a carrier signal source; a coupling capacitor connected to both said resonating inductance elements, said first pair of opposed junctions being connected to a load; the circuit formed by said bridge circuit and modulating signal source and the circuit formed by said bridge circuit and load as viewed from the modulating signal source respectively being in resonance with the carrier frequency.

2. The variable capacitance diode modulator as defined in claim 1, wherein the coupling capacitor and first inductance element are series-connected, the resonant frequency of the circuit thus formed coinciding with the carrier frequency.

References Cited by the Examiner

UNITED STATES PATENTS

| | | | |
|---|---|---|---|
| 2,555,959 | 6/1951 | Curtis | 332—30 |
| 3,023,378 | 2/1962 | Fuller | 332—47 |
| 3,068,427 | 12/1962 | Weinberg | 332—30 |
| 3,153,206 | 10/1964 | Fisher | 332—47 X |
| 3,218,579 | 11/1965 | Weingartner | 332—47 |

ROY LAKE, *Primary Examiner.*

A. L. BRODY, N. KAUFMAN, *Assistant Examiners.*